(12) United States Patent
Chinnasamy et al.

(10) Patent No.: US 12,031,853 B2
(45) Date of Patent: Jul. 9, 2024

(54) ILLUMINATION ASSEMBLY FOR LIQUID LEVEL GAUGE

(71) Applicant: Emerson Automation Solutions Final Control US LP, Houston, TX (US)

(72) Inventors: Parthasarathy Chinnasamy, Katy, TX (US); Diego Hernando, Missouri City, TX (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 465 days.

(21) Appl. No.: 17/599,090

(22) PCT Filed: Mar. 30, 2020

(86) PCT No.: PCT/US2020/025744
§ 371 (c)(1),
(2) Date: Sep. 28, 2021

(87) PCT Pub. No.: WO2020/198739
PCT Pub. Date: Oct. 1, 2020

(65) Prior Publication Data
US 2022/0196452 A1 Jun. 23, 2022

Related U.S. Application Data

(60) Provisional application No. 62/825,382, filed on Mar. 28, 2019.

(51) Int. Cl.
*G01F 23/02* (2006.01)
*G01F 23/292* (2006.01)

(52) U.S. Cl.
CPC .......... *G01F 23/02* (2013.01); *G01F 23/2924* (2013.01); *G01F 23/2927* (2013.01)

(58) Field of Classification Search
CPC ... G01F 23/02; G01F 23/2924; G01F 23/2927
See application file for complete search history.

(56) References Cited

U.S. PATENT DOCUMENTS

| | | | |
|---|---|---|---|
| 2,550,175 A | 4/1951 | Ham | |
| 2005/0056091 A1* | 3/2005 | Kowalski | G01F 23/292 |
| | | | 73/293 |
| 2005/0092082 A1* | 5/2005 | Kalix | G01F 23/02 |
| | | | 73/293 |
| 2005/0155425 A1 | 7/2005 | Kalix et al. | |
| 2005/0284219 A1 | 12/2005 | Kalix et al. | |
| 2007/0144252 A1 | 6/2007 | Kalix et al. | |

FOREIGN PATENT DOCUMENTS

| | | |
|---|---|---|
| CN | 206002167 U | 3/2017 |
| CN | 206683727 U | 11/2017 |
| DE | 102012004178 A1 | 9/2013 |
| JP | S5621720 U | 2/1981 |
| JP | 2009180624 A | 8/2009 |

* cited by examiner

*Primary Examiner* — David Z Huang
(74) *Attorney, Agent, or Firm* — Quarles & Brady LLP

(57) ABSTRACT

An illumination system can be configured for use with a liquid level gauge. A mounting bracket can be configured to secure a LED assembly to a frost-proof extension of the liquid level gauge, with the LED assembly disposed adjacent to a second edge face of the frost-proof extension that is opposite a liquid tube. The LED assembly can be thereby configured to illuminate the liquid tube via the second edge face of the frost-proof extension.

20 Claims, 7 Drawing Sheets

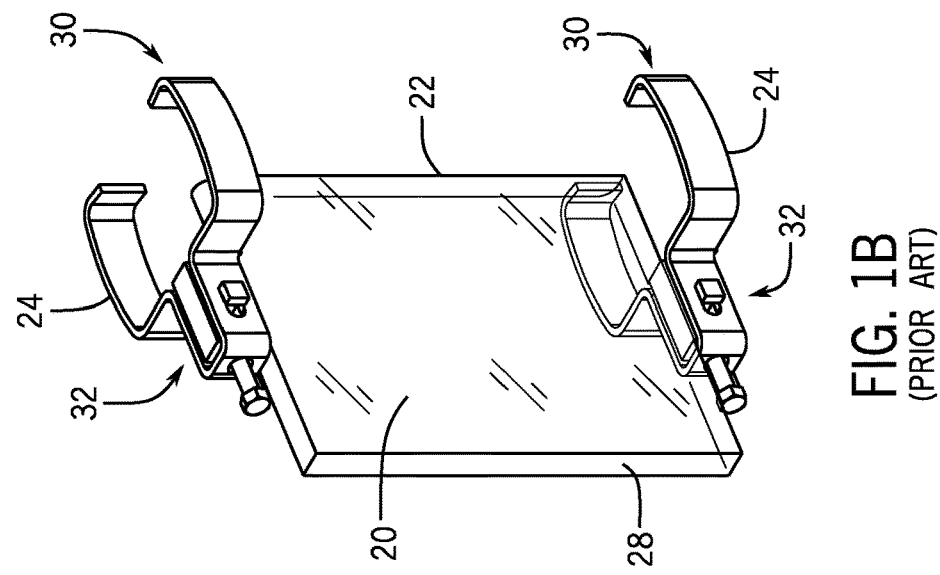
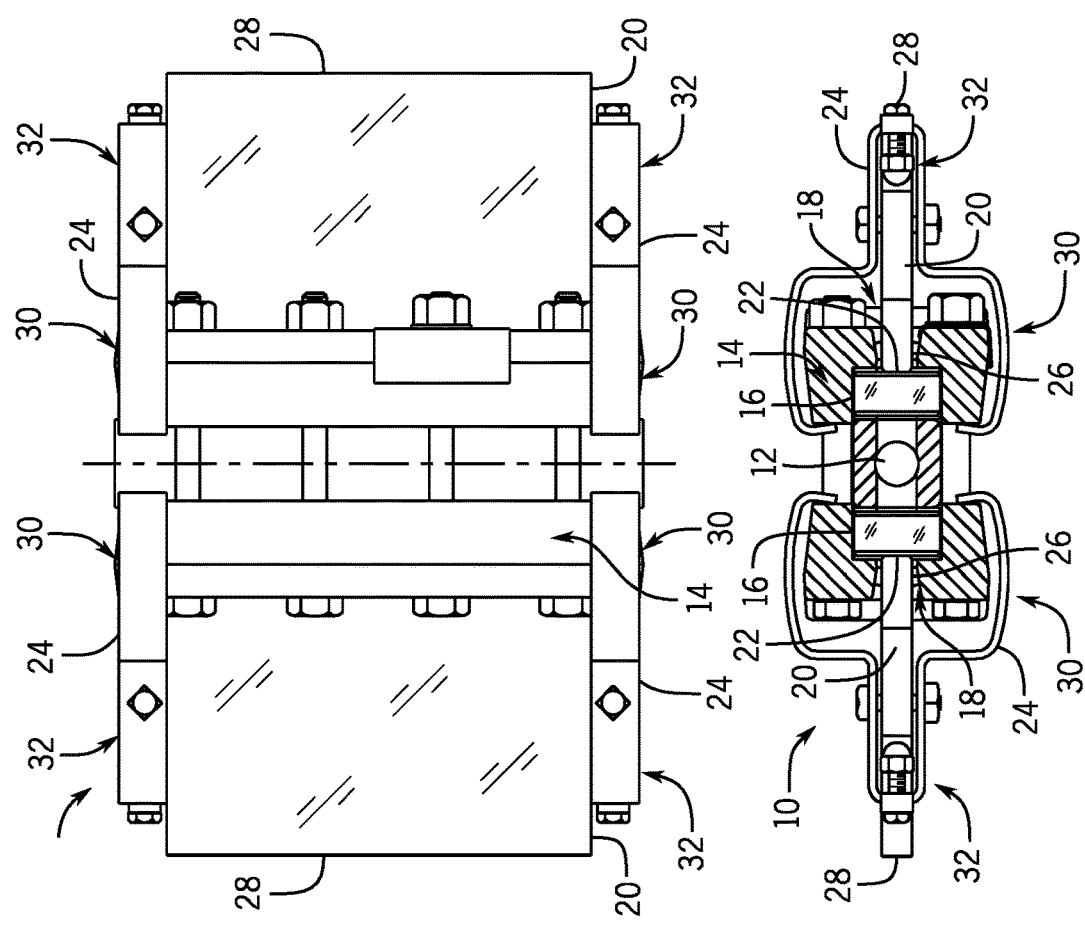
FIG. 1A (PRIOR ART)
FIG. 1B (PRIOR ART)

ILLUMINATION ASSEMBLY FOR LIQUID LEVEL GAUGE

CROSS-REFERENCE TO RELATED APPLICATIONS

This application is a national stage application, filed under 35 U.S.C. § 371, of International Application No. PCT/US2020/025744, filed Mar. 30, 2020, and claims the benefit of U.S. Provisional Application No. 62/825,382, filed on Mar. 28, 2019, the contents of each of which are incorporated herein by reference in their entirety.

BACKGROUND

Some industrial equipment can be exposed to environments or process fluids that can exhibit relatively low temperatures. Accordingly, frozen material (e.g., frost, ice, snow, etc.) can accumulate on equipment surfaces.

In some contexts, accumulation of frozen material can have undesirable effects. For example, accumulation of frost or other material on sight gauges can impede the ability of users to accurately discern liquid levels or other information.

SUMMARY

In some embodiments of the invention, an illumination system can be configured for use with a liquid level gauge. The liquid level gauge can include a liquid tube, a frost-proof extension, and an extension bracket to secure the frost-proof extension to the liquid tube. The frost-proof extension can include a substantially transparent plate with a first edge face adjacent to the liquid tube, and a second edge face opposite the first edge face to permit visual evaluation of liquid level in the liquid tube via the second edge face.

In some embodiments, the illumination system can include an LED assembly and a mounting bracket. The mounting bracket can be configured to secure the LED assembly to the frost-proof extension with the LED assembly disposed adjacent to the second edge face of the frost-proof extension. The LED assembly can be thereby configured to illuminate the liquid tube via the second edge face of the frost-proof extension.

In some embodiments, the mounting bracket can include a spacer that is configured to be secured to the extension bracket and at least one strap that extends from the spacer to the LED assembly to secure the LED assembly to the extension bracket via the spacer. The at least one strap can include an angled slot that is configured to slidably receive the spacer. The spacer can include a stud that is configured to be secured to and extend laterally away from the substantially transparent plate, and a spacer sleeve installed on the stud. The angled slot can be configured to slidably receive the stud, opposite the spacer sleeve from the substantially transparent plate, to secure the LED assembly adjacent to the second edge face of the substantially transparent plate.

In some embodiments, the spacer sleeve can be a first spacer sleeve and the angled slot can be a first angled slot. The stud can extend through the substantially transparent plate and through the extension bracket on opposing sides of the substantially transparent plate. The spacer can further include a second spacer sleeve that is installed on the stud opposite the substantially transparent plate from the first spacer sleeve. At least one strap can include a second angled slot configured to slidably receive the stud opposite the second spacer sleeve from the substantially transpired plate to secure the LED assembly adjacent to the second edge face of the substantially transparent plate. Optional or preferably the at least one strap can be a collar formed as a unitary band.

In some embodiments, the mounting bracket can be a first mounting bracket and the illumination system can further include a second mounting bracket. The second mounting bracket can be configured to further secure the LED assembly adjacent to the second edge face of the substantially transparent plate. The first mounting bracket can be secured to a first end of the LED assembly and the second mounting bracket can be secured to a second end of the LED assembly. The second mounting bracket can include a spacer with a stud and a spacer sleeve, and a collar with an angled slot that is configured to slidably receive the stud to secure the LED assembly adjacent to the second edge face of the substantially transparent plate.

In some embodiments, an illumination system may further include a support plate secured at an end of the LED assembly. The support plate can be configured to extend from the LED assembly over a portion of the substantially transparent plate, when the mounting bracket secures the LED assembly to the frost-proof extension, to align the LED assembly with the substantially transparent plate or to align the at least one strap with the spacer.

In some embodiments, an angled slot can be a Z-shaped slot with an open end at a free edge of the strap opposite the LED assembly. In some embodiments, an angled slot can be an L-shaped slot with an open end at a bottom edge of the at least one strap. The illumination system can also include sealing material disposed along an interface between the LED assembly and the frost-proof extension. The sealing material can be a silicone material.

In some embodiments, a liquid level gauge can include a liquid tube, first and second frost-proof extensions, an extension bracket, and an illumination system. The first frost-proof extension can include a substantially transparent plate with a first edge face adjacent to the liquid tube and a second edge face opposite the first edge face. The extension bracket can secure the first frost-proof extension to the liquid tube. The second frost-proof extension may be disposed opposite the liquid tube from the first frost-proof extension. The LED assembly may be configured to illuminate the liquid tube to be viewed via the second frost-proof extension.

Some embodiments of the invention further include a method of installing an illumination system for a liquid level gauge that includes a liquid tube. The method may include securing a spacer to an extension bracket that secures a frost-proof extension to the liquid tube with a first edge face of a substantially transparent plate of the frost-proof extension adjacent to the liquid tube. The method may further include aligning an open end of at least one angled slot with the spacer, the at least one angled slot being formed in at least one strap secured to an LED assembly. The method may also include guiding the spacer into the angled slot to dispose the LED assembly adjacent to a second edge face of the substantially transparent face that is opposite the first edge face.

In some embodiments, securing the spacer may include extending a stud of the spacer through the extension bracket and the substantially transparent plate and disposing the first and second spacer sleeves on the spacer on opposing sides of the extension bracket. In some embodiments, aligning the open end of at least one angled slot with the spacer can include aligning a first open end of the first slot with the stud opposite the first spacer sleeve from the substantially transparent plate and aligning a second open end of the second slot with the stud opposite the second spacer sleeve from the substantially transparent plate. In some embodiments the method can further include providing sealing material along an interface between the LED assembly and the frost-proof extension.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 1A includes a front elevation view and a top plan view of a conventional liquid level gauge;

FIG. 1B is an isometric view of a conventional frost-free extension and a conventional extension bracket for use with the liquid level gauge of FIG. 1A;

DETAILED DESCRIPTION

Figure 1D:
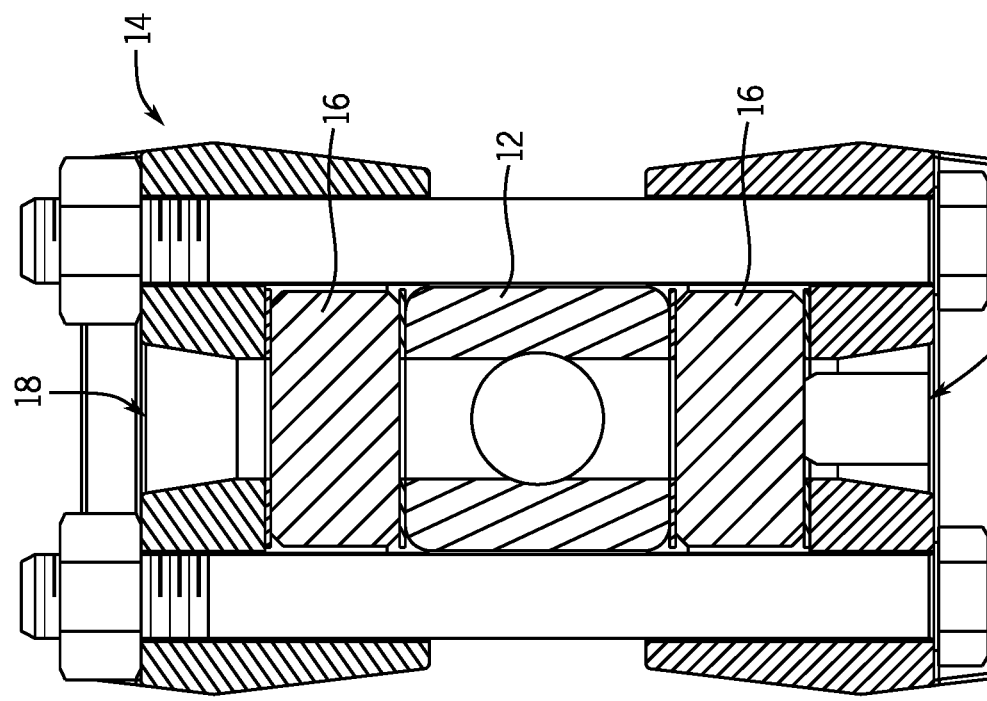
FIG. 1D is a sectional partial view the liquid level gauge of FIG. 1A.
Figure 1C:
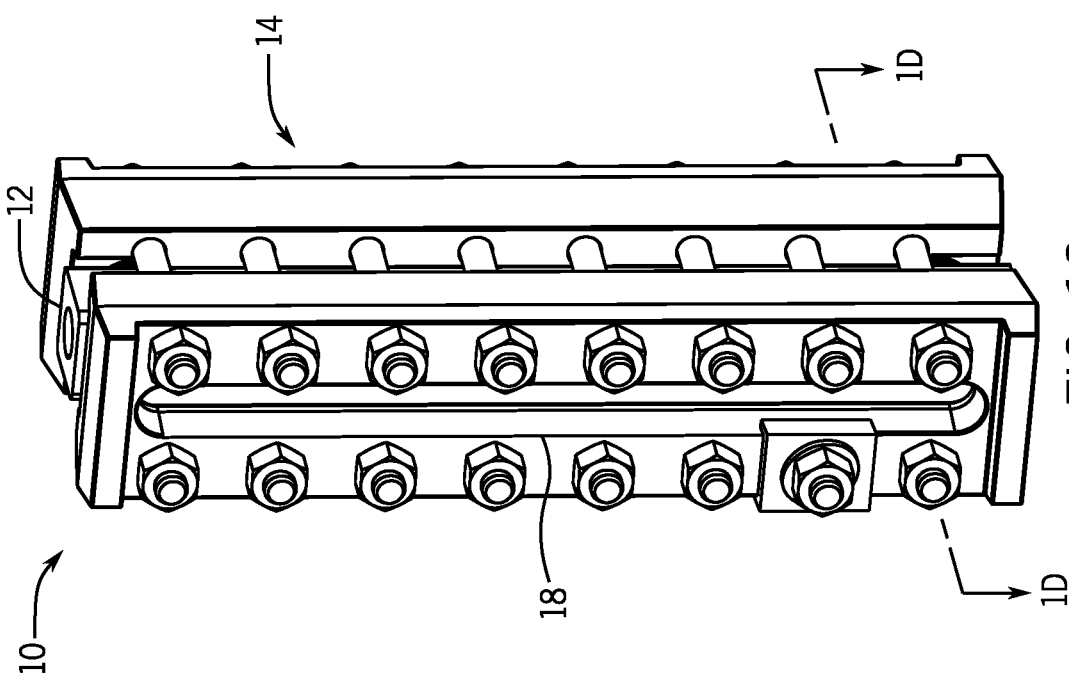
FIG. 1C is a partial isometric view of the liquid level gauge of FIG. 1A.
Figure 2:
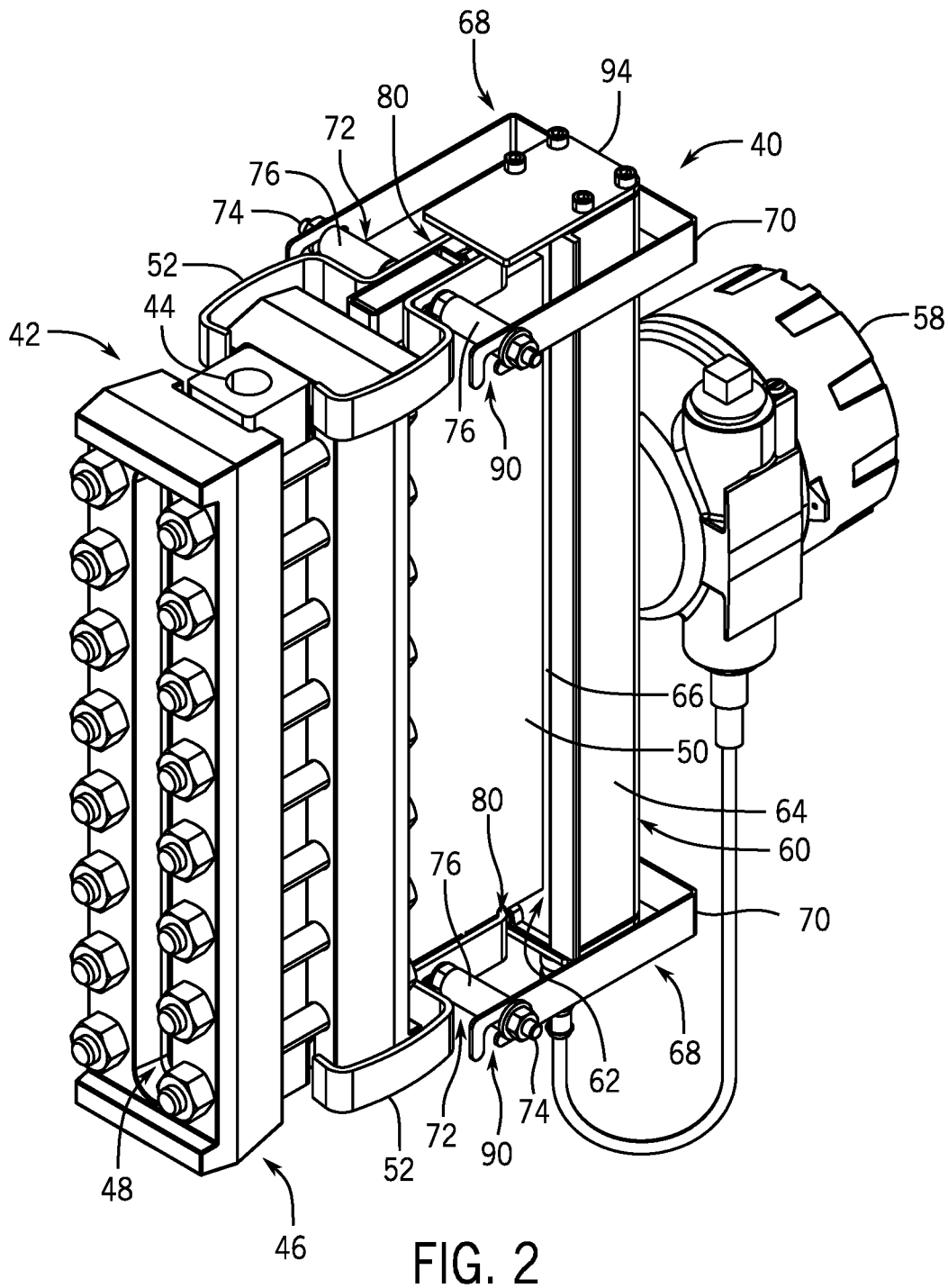
FIG. 2 is a left side isometric view of a liquid level gauge and an illumination system according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise defined or limited, the term "frost-proof" indicates a feature or component that is configured to reduce the accumulation of frozen material in particular locations. A "frost-proof" feature or component may not necessarily prevent all formation or accumulation of frozen material, depending on the relevant context.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some figures may include multiple instances of similar structures or structural relationships. For convenience of presentation, in select figures, only some of these similar structures or relationships may be specifically labeled with a reference number. One of skill in the art will recognize that the features not labeled with reference numbers can include similar aspects and perform similar functions to similar features that are labeled with reference numbers.

As discussed above, accumulation of frozen material can reduce the utility of certain devices, including sight gauges configured to evaluate liquid levels. FIGS. 1A through 1D illustrate aspects of a conventional configuration of a liquid level gauge 10 with a frost-proof viewing arrangement. In the illustrated example, a liquid tube 12 in communication with a process flow or vessel (not shown) is formed as a liquid chamber defined by a drilled bar with side slots for visibility and is mounted within covers 14 (e.g., as may include various plates, flanges, bolts, and so on). The covers 14 also support substantially transparent windows 16 (e.g., glass panes) on opposing sides of the liquid tube 12, each in alignment with a respective vision slot 18.

As used herein, "substantially transparent" refers to a body that is sufficiently transparent so as to allow visual identification of a liquid height level therethrough. For example, in some cases, a substantially transparent body may transmit 50%, 60%, 70%, 80%, 90% or more of light within a particular wavelength band of the visible spectrum.

In order to prevent accumulation of frozen material on the windows 16 or within the vision slots 18, each of the vision slots 18 receives a respective frost-proof extension 20. Each of the frost-proof extensions 20 is formed as a substantially transparent plate, such as may be formed from Poly Methyl Methacrylate (PMMA) or other materials. Interior edge faces 22 of the frost-proof extensions 20 are installed adjacent to (e.g., directly in contact with) the windows 16, with a lateral axis of each of the frost-proof extensions 20 extending through the respective vision slot 18 in alignment with the liquid tube 12. Extension brackets 24 are secured to the frost-proof extensions 20 and around the covers 14 to secure the frost-proof extensions 20 in appropriate alignment within the vision slots 18. Further, sealing material 26, such as silicone rubber or other silicone material, is injected or otherwise disposed within the vision slots 18 along the interface between the edge faces 22 and the windows 16, to help prevent infiltration of frozen material.

In order to prevent accumulation of frozen material on the windows 16 or within the vision slots 18, each of the vision slots 18 receives a respective frost-proof extension 20. Each of the frost-proof extensions 20 is formed as a substantially transparent plate, such as may be formed from Poly Methyl Methacrylate (PMMA) or other materials. Interior edge faces 22 of the frost-proof extensions 20 are installed adjacent to (e.g., directly in contact with) the windows 16, with a viewing axis of each of the frost-proof extensions 20 extending through the respective vision slot 18 in alignment with the liquid tube 12. Extension brackets 24 are secured to the frost-proof extensions 20 and around the covers 14 to secure the frost-proof extensions 20 in appropriate alignment within the vision slots 18. Further, sealing material 26, such as silicone rubber or other silicone material, is injected or otherwise disposed within the vision slots 18 along the interface between the edge faces 22 and the windows 16, to help prevent infiltration of frozen material.

With the liquid level gauge 10, including the frost-proof extensions 20 thus arranged, the accumulation of frozen material at the windows 16 can be substantially prevented, thus preserving for users the ability to visually assess liquid levels within the liquid tube 12. Further, due to the substantially transparent configuration of the frost-proof extensions 20, liquid levels within the liquid tube 12 can be readily viewed via the frost-proof extensions 20, along a line of sight that extends, coincident with the viewing axes of the frost-proof extensions 20, through exterior edge faces 28 of the frost-proof extensions 20, the interior edge faces 22, and the windows 16.

Although the arrangement in FIGS. 1A through 1D can help to facilitate visual evaluation of liquid levels in cold settings, certain lighting conditions can also impair visual evaluation of liquid levels. Accordingly, it may be useful to provide an illumination system for use with the liquid level gauge 10, or other liquid level gauges. However, the addition of lighting elements and associated other components can potentially increase the number or availability of surfaces for accumulation of frozen material. Accordingly, it may also be useful to provide an illumination system that is configured to help reduce (e.g., eliminate) this accumulation. Embodiments of the invention can provide such a benefit, or various others.

Generally, in this regard, embodiments of the invention can include illumination systems that are configured to secure an LED assembly (or other lighting assembly) adjacent to an exterior edge face of a first frost-proof extension. With the LED assembly thus secured, light from the LED assembly can be directly transmitted through the first frost-proof extension to illuminate liquid within an associated liquid tube. With the liquid thus illuminated, liquid level can be readily assessed, such as by viewing the liquid level via a second frost-proof extension opposite the first frost-proof extension.

Additionally, in some embodiments, mounting brackets for an LED assembly can help to ensure that no gaps are formed between an LED assembly and an associated frost-proof extension. For example, a mounting bracket can be configured to ensure that a cover window or other feature of an LED bank is secured in contact with an exterior edge face of a frost-proof extension. In this way, for example, embodiments of the invention can help to ensure that frozen material does not accumulate to block light transmission from the LED assembly into the frost-proof extension.

FIGS. 2-4B illustrate an example configuration of an illumination system 40 according to an embodiment of the invention. In the illustrated arrangement, the illumination system 40 is installed for use with a liquid level gauge 42 that is substantially similar to the liquid level gauge 10 of FIG. 1A, although other arrangements (e.g., with other liquid gauges) are possible. Similarly to the liquid level gauge 10, for example, the liquid level gauge 42 includes a liquid tube 44, covers 46, windows 54 (see FIG. 4B) within the covers 46, vision slots 48, frost-proof extensions 50 formed as a substantially transparent plates, and extension brackets 52, each of which is configured similarly to the components illustrated in FIG. 1A. The extension brackets 52 are secured to the frost-proof extensions 50 and around the covers 46 to secure the frost-proof extensions 50 in appropriate alignment within the vision slots 48. In general, the extension brackets 52 can secure the frost-proof extensions 50 to the liquid tube 44. In the illustrated arrangement, only one of the frost-proof extensions 50 and one of the associated extension bracket 52 are shown, although another similar frost-proof extension would typically be installed with a similar extension bracket at the vision slot 48, opposite the liquid tube 44 from the illumination system 40. (As used herein, "substantially similar" is used to describe manufactured systems or arrangements that are the same, within acceptable manufacturing tolerances.)

To improve readability of the liquid level gauge 42 in various lighting conditions that could reduce the visibility of liquid levels, the illumination system 40 includes an LED assembly 60. As further detailed below, the LED assembly 60 is configured to illuminate the liquid tube 44 via the illustrated frost-proof extension 50, such as may facilitate viewing of the liquid tube 44 via the opposing vision slot 48 and an associated frost-proof extension (not shown).

The LED assembly 60 can be configured to use any variety of illumination configurations and techniques. In the illustrated embodiment, for example, the LED assembly 60 includes a bank of LEDs 62 that are supported within a housing 64 and are powered and controlled by an associated electronics module 58. The housing 64 is open along an inner side thereof, so an exterior edge face 66 of the frost-proof extension 50 can be inserted into the housing 64 to be disposed adjacent to the bank of LEDs 62 (e.g., directly in contact with a glass cover 78 of the LEDs 62 (see FIG. 4B)). In other embodiments, however, other configurations are possible. For example, in some embodiments, a housing can be formed with a closed interior side that can itself be disposed adjacent to (e.g., in contact with) an exterior edge face of a frost-proof extension.

In different embodiments, a variety of different mounting brackets can be used to secure an LED assembly to the liquid level gauge 42. In some contexts, however, it may be useful to combine certain aspects of mounting brackets for an LED assembly with certain aspects of extension brackets for a frost-proof extension. For example, configuring mounting and extension brackets to use similar or overlapping components can help to reduce the require materials, improve overall alignment of system components, and provide relatively easy installation processes.

In this regard, for example, FIGS. 2-4B illustrate an example mounting bracket 68 that is configured to secure the LED assembly 60 to the liquid level gauge 42 and also to help secure the extension brackets 52 to the frost-proof extension 50. In particular, the mounting bracket 68 includes a strap 70 that is secured to the LED assembly 60 at the housing 64. The mounting bracket 68 also includes a spacer 72 that secures the strap 70 to the liquid level gauge 42.

In some embodiments, as illustrated in FIGS. 2-4B, a spacer such as the spacer 72 can allow an LED assembly to be readily secured to a liquid level gauge with a frost-proof extension despite potential dimensional differences between the two systems. Indeed, such an arrangement can, in particular, help to secure an LED assembly to be disposed adjacent to (e.g., directly in contact with) an exterior edge face of the frost-proof extension. In this way, for example, the LED assembly can directly illuminate the associated liquid tube via the frost-proof extension, without necessarily requiring complicated optical arrangements (e.g., bending lenses) or risking obfuscation of the lighting by accumulation of frozen material in relevant gaps.

Generally, a variety of configurations are possible for a spacer arrangement. In the illustrated embodiment, the spacer 72 secures the strap 70 to the liquid level gauge 42 via the frost-proof extension 50. In this regard, for example, the spacer 72 usefully includes a stud 74 (e.g., a threaded rod or bolt), and at least one spacer sleeve 76 installed on (e.g., surrounding a portion of) the stud 74. The stud 74 can be secured to the frost-proof extension 50, such as with one or more threaded nuts, to extend laterally away from the frost-proof extension 50. The strap 70 can be secured to the stud 74 opposite the associated spacer sleeve(s) 76 from the frost-proof extension 50. In some embodiments, the spacer 72 can include a first and second studs that are secured to the frost-proof extension 50.

In some embodiments, a spacer arrangement can be used to secure components other than a LED assembly. For example, in the illustrated embodiment, the stud 74 can also secure a clamp portion 80 of the extension bracket 52 to the frost-proof extension 50. Accordingly, a single mounting arrangement, e.g., the spacer 72, can help to secure the frost-proof extension 50 and the LED assembly 60 to the liquid level gauge 42. This may be useful, for example, in order to minimize the number of components and the spatial footprint that may be required to provide the desired illumination and monitoring functionality.

In some embodiments, a spacer can extend on opposing sides of a frost-proof extension or other component. For example, in the embodiment illustrated in FIGS. 2-4B, the stud 74 of the spacer 72 extends fully through the frost-proof extension 50 and two of the spacer sleeves 76 are disposed around the stud 74 on respective opposing sides of the frost-proof extension 50. Accordingly, for example, the strap 70 can be configured as a collar that extends fully around an upper (or other) end of the housing 64, with free ends that are configured to engage the spacer 72 on opposing sides of the frost-proof extension 50. In some installations, this arrangement can provide a highly resilient and laterally balanced connection between the LED assembly 60 and the liquid level gauge 42, as may help to ensure stability and ease of installation. Further, through appropriate selection of the stud 74 and the spacer sleeves 76, LED assemblies and frost-proof extensions of any variety of different dimensions can be accommodated. However, other configurations are possible, including configurations in which multiple straps engage respective opposing sides of a particular spacer.

In the illustrated embodiment, the stud 74 of the spacer 72 extends fully through the frost-proof extension 50, the clamp portion 80 of the extension bracket 52, and the spacer sleeves 76. Accordingly, the stud 74 and the extension bracket 52 can be readily secured to the frost-proof extension 50—and the frost-proof extension 50 can be secured to the liquid level gauge 42—using a set of nuts on opposing sides thereof. And, as appropriate, the strap 70 can then be further secured to the stud 74 using additional nuts. In other embodiments, however, other approaches are possible. For example, spring clips or other non-threaded fasteners can be used, as can other fastening arrangements.

Figure 3:
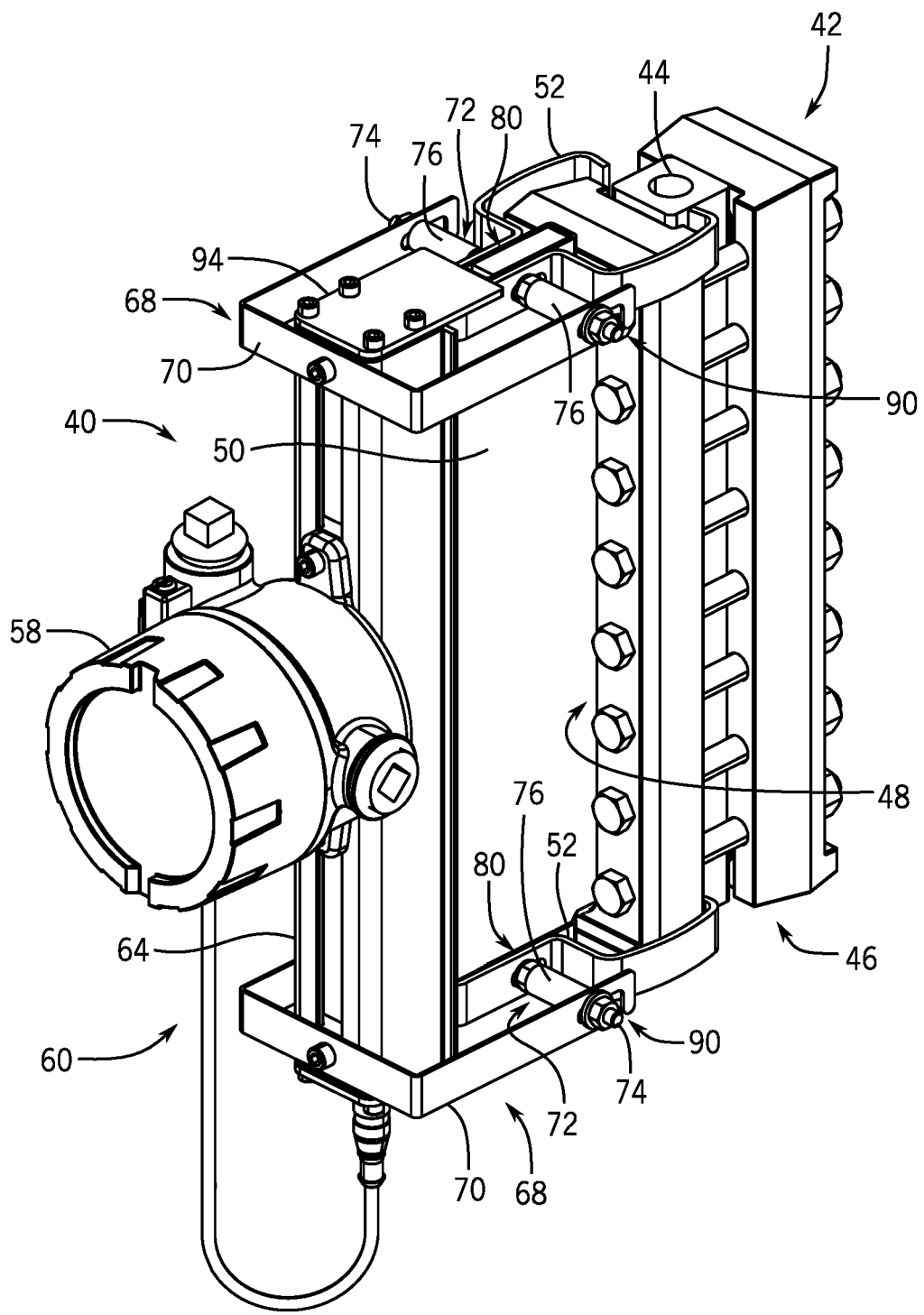
FIG. 3 is a right side isometric view of the liquid level gauge and illumination system of FIG. 2.

As another example aspect of some embodiments, the strap 70 is configured as a collar and, as illustrated in FIG. 3 in particular, extends as a unitary band from opposing ends of the spacer 72 around the exterior of the LED assembly 60. Further, the strap 70 is directly secured to the LED assembly 60 using a bolt or other fastener. In other embodiments, however, other configurations are possible. For example, a strap can be formed from multiple pieces, can be secured to an LED assembly with a hook, catch, recess or other structure, or can be otherwise configured.

In some configurations, such as those for which a strap is to be secured to a spacer after the spacer is installed on a liquid level gauge, it may be useful to configure the strap with slotted ends. In this way, for example, a spacer can be secured to a frost-proof extension (e.g., as shown in FIGS. 2-4B) and a strap can be secured to an LED assembly. The strap can then be engaged with the spacer by inserting one or more ends of the spacer into the slot(s) on the strap, thereby appropriately securing the LED assembly to the frost-proof extension. Thus, for example, in contrast to conventional arrangements, lighting assemblies for frost-proof gauges can be readily installed or uninstalled as needed, including for maintenance and for retrofitting of existing systems.

Figure 5A:
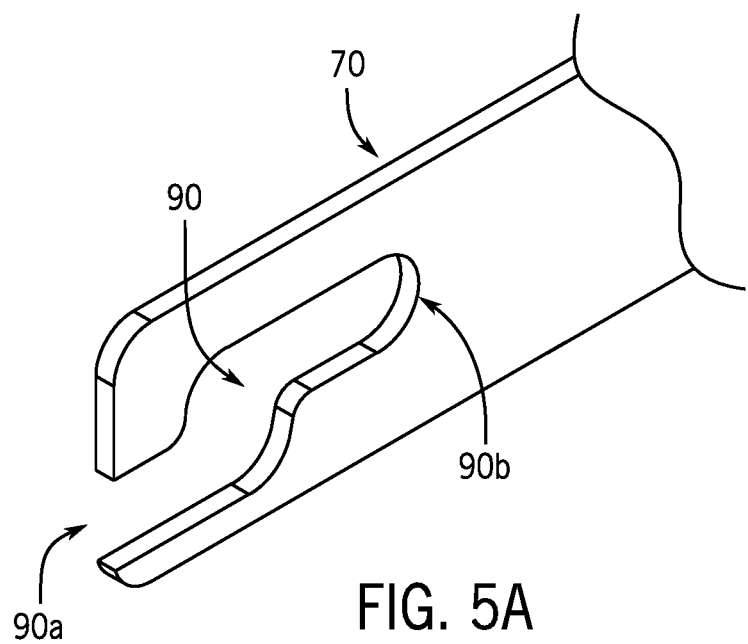
FIGS. 5A and 5B are schematic views of example attachment interfaces of a mounting bracket for use with the liquid level gauge and illumination system of FIG. 2.

In some embodiments, slots on a strap can be configured as angled slots, with one or more angled bends therein, to help establish and maintain appropriate engagement with relevant parts of a spacer. As illustrated in FIG. 5A in particular, for example, each end of the strap 70 includes a Z-shaped slot 90, with an open end 90a at the respective free edge 70a of the strap 70, opposite the bank of LEDs 62, and two bends (e.g., 90-degree bends) leading to a blind end 90b.

With this arrangement, for example, the spacer 72 can be installed to secure the frost-proof extension 50 to the liquid level gauge 42 (see, e.g., FIGS. 4A and 4B), and the spacer sleeves 76 and various associated nuts (or other components) attached thereto. As desired, the strap 70 can then be engaged with the spacer 72 by aligning the stud 74 with the open end 90a of the slot 90 and guiding the stud 74 through the slot 90 until the LED assembly 60 is appropriately adjacent to the exterior edge face 66 of the frost-proof extension. For example, the stud 74 can be guided through the slot 90 until the stud 74 is at the blind end 90b of the slot 90 or until the LED assembly 60 is disposed appropriately adjacent to the exterior edge face 66 of the frost-proof extension 50 (e.g., so that there is no gap between the exterior edge face 66 and the cover 78 of the bank of LEDs 62). As appropriate, a set of nuts can then be tightened onto the stud 74 to further secure the strap 70 thereto.

In some embodiments, slotted straps can facilitate adjustability of an illumination system relative to a frost-free extension or other component. For example, during installation or thereafter, the studs 74 can be slidably adjusted along the extended profile of the z-shaped slot 90 until the LED assembly 60 or another, differently configured LED assembly is appropriately aligned with the frost-proof extension 50. For example, the studs 74 can be slid along the slot 90 until a glass cover on the bank of LEDs 62 appropriately (e.g., fully) contacts the exterior edge face 66 of the frost-proof extension 50. With the LED assembly 60 thus aligned, the straps 70 can be fully secured to the spacers 72 (e.g., by tightening the relevant nuts) and, as appropriate, adhesive can be introduced such as by adding a glue bead (e.g., a silicone rubber sealant and adhesive) along an interface between the LED assembly 60 and the frost-proof extension 50 (e.g., at the glass cover 78.

In some embodiments, a first strap may have a first angled slot that can be aligned with a first spacer, and a second strap may have a second angled slot that can be aligned with a second spacer. The first and second straps may be guided onto the first and second spacers, respectively, simultaneously or independent of each other. In some embodiments, the first and second angled slots may have similar or differing slot profiles. For example, the first angled slot may be an L-shaped slot and the second angled slot may be a Z-shaped slot. In use, once an open end of at least one angled slot formed in the strap 70 is aligned with the spacer 72, the spacer 72 can be guided into the angled slot to dispose the LED assembly 60 adjacent to the exterior edge face 66 of the of the frost-proof extension 50.

The noted arrangement can also be useful, for example, when multiple straps and spacers are used. For example, as alluded to above, the illumination system 40 includes a set of two of the straps 70 and two of the spacers 72. With both of the straps 70 including slotted ends (e.g., as shown in FIG. 5A), it may be relatively easy to secure the straps 70 to the respective spacers 72, and thereby to secure the LED assembly 60 in appropriate alignment with the frost-proof extension 50. Indeed, for some configurations, as also discussed above, an LED assembly can be appropriately secured even after spacers have already been installed to secure a frost-proof extension in alignment within a relevant vision slot or other feature.

Figure 5B:
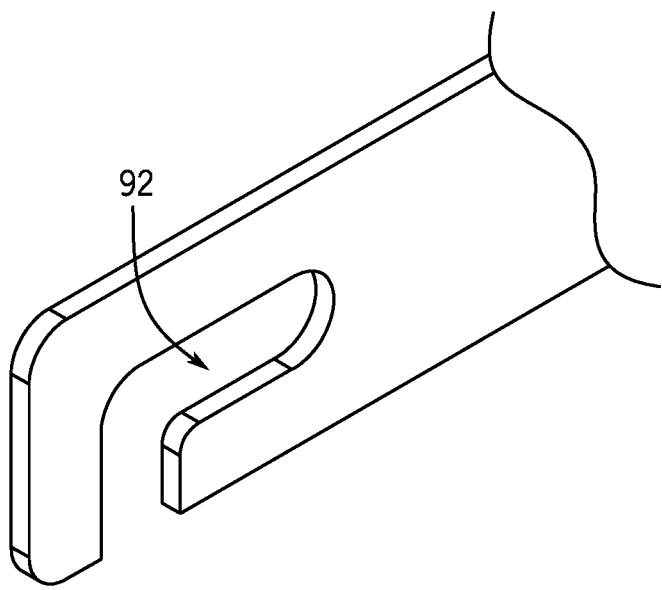

Still further, in other embodiments, other configurations may be possible. In some embodiments, an angled slot for a strap can be configured other than with a Z-shape. For example, as illustrated in FIG. 5B, some straps according to the invention can include an L-shaped slot 92, with an open end at a bottom edge of the strap 70. Generally, a strap with the slot 92 can be installed similarly to the strap 70 (e.g., as with the z-shaped slot 90), albeit with a different relative movement to seat the stud 74 within the slot 92, or in various other ways.

In some embodiments, other features can be included. For example, referring again to FIGS. 2-4B, a support plate 94 is secured at one end of the housing 64 of the LED assembly 60. With the straps 70 secured to the spacers 72, the support plate 94 is configured to extend over part of the frost-free extension 50, such as in an overlapping arrangement with the clamp portion 80 of the extension bracket 52. In some embodiments, this can help to secure the illumination system 40 against movement relative to the liquid level gauge 42, can help to ensure appropriate alignment of the straps 70 with the spacers 72 or of the bank of LEDs 62 with the exterior edge face 66 of the frost-proof extension, or can otherwise generally assist in appropriately securing the illumination assembly 40 in place.

Figure 4A:
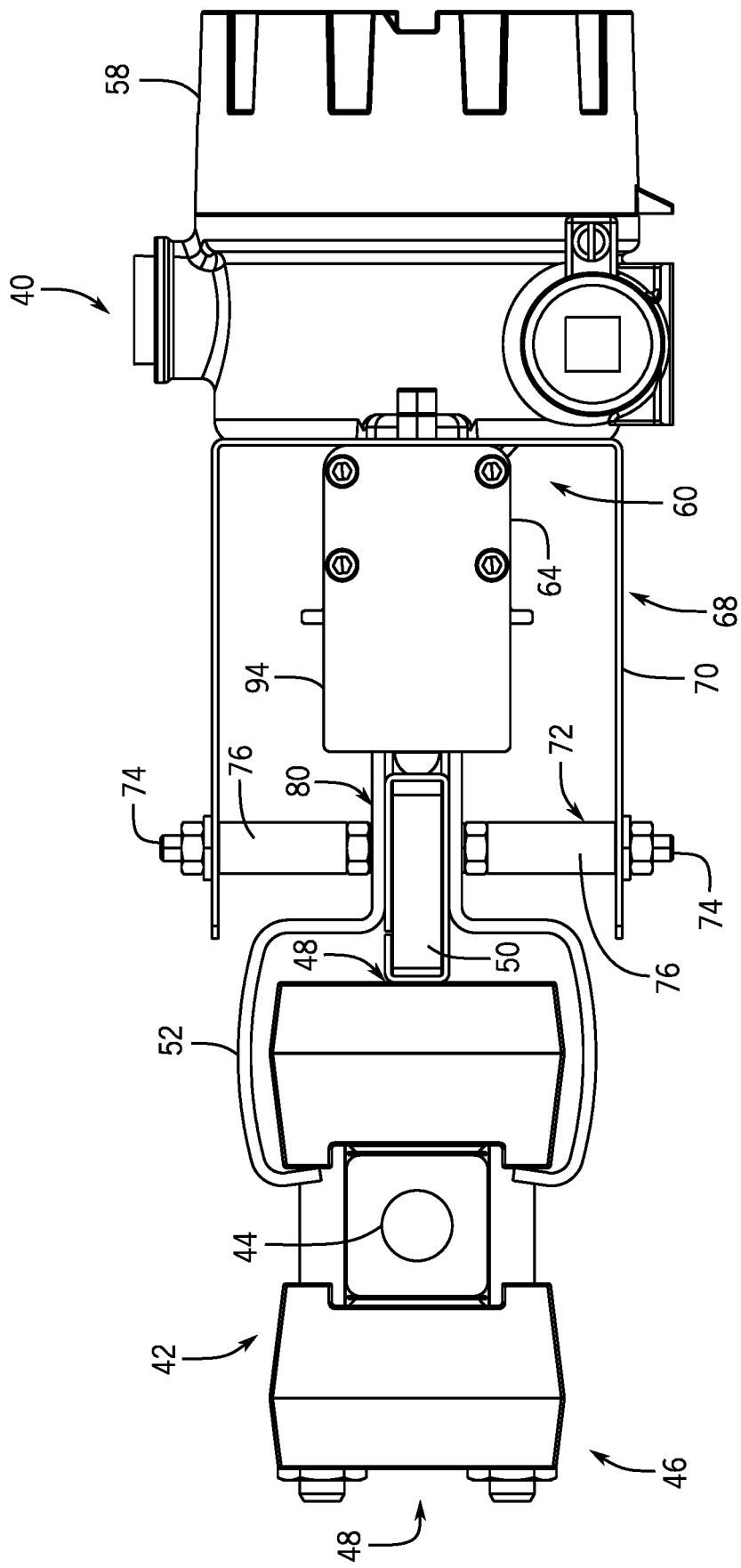
FIG. 4A is a top plan view of the liquid level gauge and illumination system of FIG. 2.
Figure 4B:
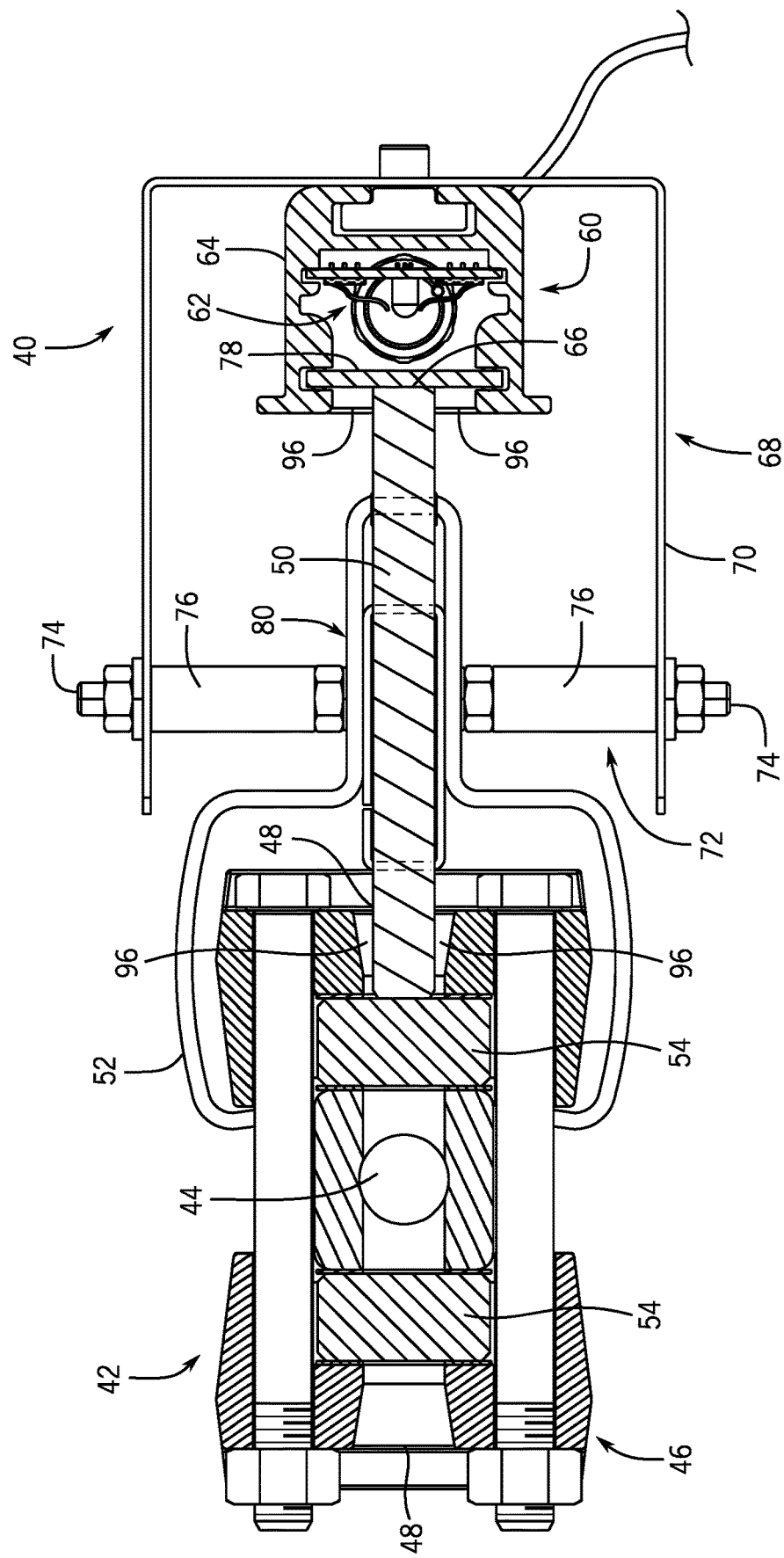
FIG. 4B is a top sectional partial view of the liquid level gauge and illumination system of FIG. 2.

As another example, it may be useful to dispose sealing material along appropriate interfaces of the illumination system 40. For example, as shown in FIG. 4B in particular, sealing material 96 such as silicone rubber, has been disposed (e.g., injected as an extended bead) along the interface between the bank of LEDs 62 and the exterior edge face 66 of the frost-proof extension 50. In some configurations, the sealing material 96, thus installed, can help to prevent infiltration or accumulation of frozen material such as could adversely affect illumination of the liquid tube 44 by the LED assembly 60. In other embodiments, however, other arrangements are possible. For example, some arrangements can include sealing material at other locations.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

In this regard, some embodiments can include a method of installing an illumination system on a liquid level gauge with a frost-proof extension. For example, in some embodiments, a method of installing the illumination system 40 (see, e.g., FIG. 2) includes securing the spacers 72 to the extension brackets 52. As described above, the extension brackets 52 secure the frost-proof extensions 50 to the liquid tube 44 such that the exterior edge face 66 is adjacent to the liquid tube 44. In some embodiments, the spacers 72 may be installed by extending the stud 74 through the extension bracket 52 and the frost-proof extensions 50 and disposing the spacer sleeves 76 on opposing sides of the extension bracket 52. In some embodiments, first and second extension brackets may be installed to the liquid level gauge 42 at, for example, a top and a bottom thereof. Correspondingly, some methods of installation can include installing a spacer on top and bottom extension brackets, respectively, such as by extending a respective stud through each of the extension brackets and then installing spacer sleeves onto each of the studs on opposing sides of the respective extension bracket.

With a spacer installed, including the spacer 72, a method of installation may further include aligning an open end of an angled slot, such as the open end 90*a* of the Z-shaped slot 90, with a corresponding spacer. As illustrated, in FIGS. 2 and 3, the strap 70 includes first and second slots 90. As such, some methods can include aligning the open end of a first slot with a stud opposite a first spacer sleeve from a frost-proof extension and aligning the open end of a second slot with a stud opposite a second spacer sleeve from the frost-proof extension. In other embodiments, a different angled slot formed in a strap, such as, for example, the slot 92 of FIG. 5B, can be similarly aligned with a spacer.

Once slots on a strap have been aligned with a spacer, the spacer can be guided along the slots to complete alignment of the associated LED assembly. For example, as also discussed above, the studs 74 of the illumination system 40 can be slid along the different slots 90 until a glass cover on the bank of LEDs 62 appropriately (e.g., fully) contacts the exterior edge face 66 of the frost-proof extension 50. With the LED assembly 60 thus aligned, the straps 70 can then be further secured to the spacers 72 (e.g., by tightening the relevant nuts). In some cases, as appropriate, adhesive or sealing material can be introduced such as by adding a glue bead (e.g., a silicone rubber sealant and adhesive) along an interface between the LED assembly 60 and the frost-proof extension 50 (e.g., at the glass cover 78

Thus, embodiments of the disclosed illumination assembly can provide various benefits for liquid level gauges and other systems. For example, in some embodiments, a mounting bracket can be configured to efficiently and effectively secure a LED assembly in alignment with a frost-free extension of a liquid level gauge in order to allow the gauge to be read even in low-light conditions.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An illumination system for a liquid level gauge, the liquid level gauge including a liquid tube, a frost-proof extension that includes a substantially transparent plate with a first edge face adjacent to the liquid tube and a second edge face opposite the first edge face, and an extension bracket that secures the frost-proof extension to the liquid tube, the illumination system comprising:
- an LED assembly;
- a mounting bracket configured to secure the LED assembly to the frost-proof extension with the LED assembly disposed adjacent to the second edge face of the substantially transparent plate, the LED assembly being thereby configured to illuminate the liquid tube via the second edge face of the substantially transparent plate;
- a spacer configured to be secured to the extension bracket and including a stud and a spacer sleeve installed on the stud; and
- at least one strap having an angled slot configured to slidably receive the stud, opposite the spacer sleeve from the substantially transparent plate, to secure the LED assembly to the extension bracket.

2. The illumination system of claim 1, wherein the stud extends through the substantially transparent plate and through the extension bracket on opposite sides of the substantially transparent plate.

3. The illumination system of claim 1, wherein the spacer sleeve is a first spacer sleeve and the spacer further includes a second spacer sleeve installed on the stud opposite the substantially transparent plate from the first spacer sleeve.

4. The illumination system of claim 3, wherein the angled slot is a first angled slot and the at least one strap includes a second angled slot configured to slidably receive the stud opposite the second spacer sleeve from the substantially transparent plate to secure the LED assembly adjacent to the second edge face of the substantially transparent plate.

5. The illumination system of claim 4, wherein the at least one strap is a collar formed as a unitary band.

6. The illumination system of claim 1, wherein the mounting bracket is a first mounting bracket, and
wherein the illumination system further comprises a second mounting bracket configured to further secure the LED assembly adjacent to the second edge face of the substantially transparent plate.

7. The illumination system of claim 6, wherein the first mounting bracket is secured to a first end of the LED assembly, the second mounting bracket is secured to a second end of the LED assembly, and the second mounting bracket includes:
- a second-bracket spacer with a second-bracket stud and a second-bracket spacer sleeve; and
- a second-bracket collar with an angled slot that is configured to slidably receive the second-bracket stud to secure the LED assembly adjacent to the second edge face of the substantially transparent plate.

8. The illumination system of claim 1, further comprising:
a support plate secured at an end of the LED assembly, the support plate configured to overlap the extension bracket to align the at least one strap with the spacer.

9. The illumination system of claim 1, wherein the angled slot is a Z-shaped slot with an open end at a free edge of the at least one strap opposite the LED assembly.

10. The illumination system of claim 1, wherein the angled slot is an L-shaped slot with an open end at a bottom edge of the at least one strap.

11. The illumination system of claim 1, further comprising:
sealing material disposed along an interface between the LED assembly and the frost-proof extension, and optionally or preferably wherein the sealing material is a silicone material.

12. A liquid level gauge comprising:
a liquid tube;
a frost-proof extension that includes a substantially transparent plate with a first edge face adjacent to the liquid tube and a second edge face opposite the first edge face;
an LED assembly; and
a mounting bracket that secures the LED assembly to the frost-proof extension, the mounting bracket comprising:
- a spacer that includes a stud configured to be secured to and extend laterally away from the substantially transparent plate; and
- at least one strap that includes a slot configured to slidably receive the spacer with the strap spaced apart from the frost-proof extension along the spacer.

13. The liquid level gauge of claim 12, wherein the stud extends through the substantially transparent plate and through an extension bracket on opposing sides of the substantially transparent plate, the extension bracket configured to secure the frost-proof extension to the liquid tube.

14. The liquid level gauge of claim 12, wherein the mounting bracket further comprises a first spacer sleeve and a second spacer sleeve, through which the stud extends on opposite sides of the frost-proof extension;
wherein the slot is a first angled slot configured to slidably receive the stud opposite the first spacer sleeve from the substantially transparent plate, and
wherein the at least one strap includes a second angled slot configured to slidably receive the stud opposite the second spacer sleeve from the substantially transparent plate to secure the LED assembly adjacent to the second edge face of the substantially transparent plate.

15. The liquid level gauge of claim 14, wherein the strap is formed as a unitary band.

16. The liquid level gauge of claim 12, wherein the frost-proof extension is a first frost-proof extension, the liquid level gauge further comprising:
a second frost-proof extension disposed opposite the liquid tube from the first frost-proof extension, wherein the LED assembly is configured to illuminate the liquid tube via the first frost-proof extension to be viewed via the second frost-proof extension.

17. The liquid level gauge of claim 12, wherein the LED assembly includes a bank of LEDs, and
wherein the LED assembly is secured by the mounting bracket to be adjacent to the second edge face, in contact with a cover of the bank of LEDs.

18. A method of installing an illumination system for a liquid level gauge that includes a liquid tube, the method comprising:
extending a stud through an extension bracket that secures a frost-proof extension to the liquid tube with a first edge face of a substantially transparent plate of the frost-proof extension adjacent to the liquid tube;
disposing at least one spacer sleeve on the stud;
aligning an open end of at least one slot with the stud, the at least one slot being formed in at least one strap secured to an LED assembly; and
guiding the stud into the at least one slot, with the at least one slot spaced apart from the substantially transparent plate along the stud by the at least one spacer sleeve, to dispose the LED assembly adjacent to a second edge face of the substantially transparent plate that is opposite the first edge face.

19. The method of claim 18, wherein extending the stud through the extension bracket includes extending the stud through the substantially transparent plate; and wherein disposing the at least one spacer sleeve on the stud includes disposing a first spacer sleeve on the stud on a first side of the transparent plate and disposing a second spacer sleeve on the stud on a second side of the transparent plate that is opposite the first side.

20. The method of claim 19, wherein aligning the open end of the at least one slot with the stud includes aligning a first open end of a first angled slot with the stud opposite the first spacer sleeve from the substantially transparent plate on the first side of the transparent plate and aligning a second open end of a second angled slot with the stud opposite the second spacer sleeve from the substantially transparent plate.

\* \* \* \* \*

UNITED STATES PATENT AND TRADEMARK OFFICE
CERTIFICATE OF CORRECTION

| | |
|---|---|
| PATENT NO. | : 12,031,853 B2 |
| APPLICATION NO. | : 17/599090 |
| DATED | : July 9, 2024 |
| INVENTOR(S) | : Parthasarathy Chinnasamy et al. |

It is certified that error appears in the above-identified patent and that said Letters Patent is hereby corrected as shown below:

In the Specification

Column 5, after Line 22, insert the following paragraph:
--To appropriately secure the frost-proof extensions 20 relative to the liquid level gauge 10, different types of extension brackets can be provided. For example, in the illustrated embodiment, the extension brackets 24 include hooked portions 30 that are configured to engage the covers 14, and clamp portions 32 that are configured to be secured (e.g., bolted) to the frost proof extensions 20. In other embodiments, however, other configurations are possible.--.

Signed and Sealed this
Third Day of September, 2024

Katherine Kelly Vidal
*Director of the United States Patent and Trademark Office*